United States Patent [19]

Sawafuji et al.

[11] Patent Number: 4,747,811
[45] Date of Patent: May 31, 1988

[54] AUTOMATIC BELT TENSIONER

[75] Inventors: Shuji Sawafuji, Higashimurayama; Masahiro Ozawa, Akikawa; Hiroshi Yoshikawa, Mitaka, all of Japan

[73] Assignee: Fuji Jukogyo Kabushiki Kaisha, Tokyo, Japan

[21] Appl. No.: 6,503

[22] Filed: Jan. 21, 1987

[30] Foreign Application Priority Data

Jan. 25, 1986 [JP] Japan .................. 61-14424

[51] Int. Cl.$^4$ .............................. F16H 7/12
[52] U.S. Cl. .................... 474/135; 474/138
[58] Field of Search ........... 474/133, 135, 136, 138, 474/109–111, 101

[56] References Cited

U.S. PATENT DOCUMENTS

| 4,151,756 | 5/1979 | Binder et al. ............ 474/138 |
| 4,411,638 | 10/1983 | Wilson ................ 474/136 X |
| 4,573,952 | 3/1986 | Schulze ............... 474/133 X |
| 4,657,524 | 4/1987 | Okabe ................. 474/133 X |

FOREIGN PATENT DOCUMENTS 56-83647 7/1981 Japan .
57-40149 3/1982 Japan .

Primary Examiner—James A. Leppink
Assistant Examiner—Thuy M. Bui
Attorney, Agent, or Firm—Martin A. Farber

[57] ABSTRACT

A belt tensioner has a shaft having an oil reservoir in a lower portion thereof and having an external thread and rotatably mounted in a body, a torsion spring provided between the body and the shaft so as to urge the shaft in a rotational direction, and a cylindrical rod having an internal thread engaged with the external thread of the shaft. A lower end of the rod being projected from the body so as to be operatively connected to a tension pulley for a belt. The torsion spring and both the threads are arranged to project rod by the rotation of the shaft urged by the torsion spring. An oil passage is provided in the shaft so as to communicate the oil reservoir with the bore above the internal thread of the rod.

2 Claims, 3 Drawing Sheets

AUTOMATIC BELT TENSIONER

BACKGROUND OF THE INVENTION

The present invention relates to an automatic tensioner for tensioning a belt such as a timing belt for an automotive engine and more particularly to a spring loaded screw type tensioner.

Japanese Patent Laid Open Nos. 56-83647 and 57-40149 disclose screw type tensioners applied to chain driven camshaft mechanisms. The tensioner has a shaft applied with torque by a torsion spring and an actuating rod having a thread engaged with a thread of the shaft. The shaft is urged by the spring in a rotational direction to project the actuating rod. When the tension of a chain decreases as a result of the expansion of the chain, the rod is projected by the rotation of the shaft to push a chain guide, thereby automatically tensioning the chain.

In the screw type tensioner, since a large force is continuously exerted on the thread, a square threaded screw device having a high rigidity is employed. In the square threaded screw device, the amount of particles produced by abrasion of threads increases, due to large friction between the threads. Therefore, it is preferable to use oil having a low viscosity rather than grease for a sufficient lubrication in order to wash down the particles. Accordingly, although the conventional tensioner can be applied to a chain drive device mounted inside an engine body in which engine oil splashes to lubricate the device, it cannot be applied to a timing belt drive device provided outside the engine body.

SUMMARY OF THE INVENTION

The object of the present invention is to provide an automatic belt tensioner wherein a reliably sealed lubricating system is provided so as to sufficiently wash down particles resulting from the abrasion of screws.

According to the present invention, there is provided an automatic belt tensioner comprising a substantially vertically disposed cylindrical body having an axial chamber, a shaft having an oil reservoir in a lower portion thereof and having an external thread in the chamber of the body, a torsion spring provided between the body and the shaft so as to urge the shaft in a rotational direction, and a cylindrical rod having an axial bore and an internal thread provided at an intermediate portion with respect to axial length of the bore and engaged with the external thread of the shaft.

A lower end of the rod is projected from the body so as to be operatively connected to a tension pulley for a belt. The rod is held by holding means so as to be axially moved.

Circulating means is provided for circulating oil between the oil reservoir in the shaft and the bore below the internal thread of the rod. The torsion spring and both the threads are arranged to project the rod by the rotation of the shaft urged by the torsion spring.

In an aspect of the invention, the circulating means comprises a passage provided in the shaft so as to communicate the oil reservoir with the bore above the internal thread of the rod, and an air passage provided in the shaft to communicate the oil reservoir with the atmosphere.

The other objects and features of this invention will become understood from the following description with reference to the accompanying drawings.

DETAILED DESCRIPTION OF THE INVENTION

Figure 1:
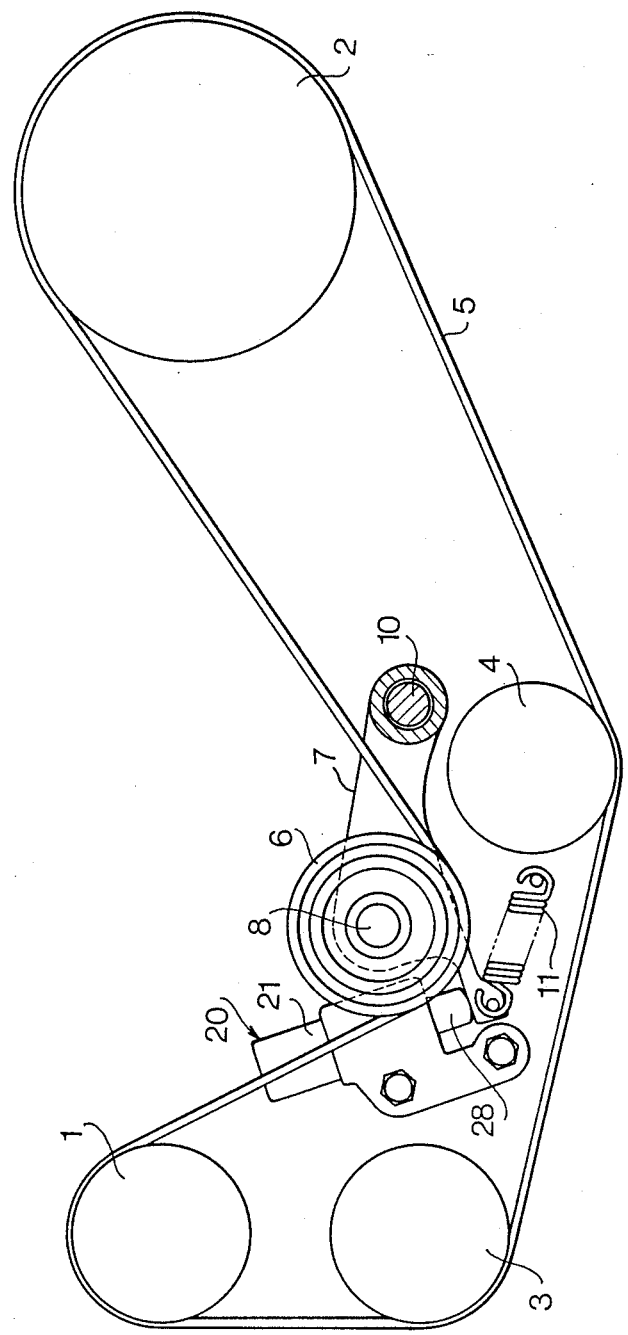
FIG. 1 is a side view showing a timing belt drive device for an engine to which the present invention is applied.
Figure 2:
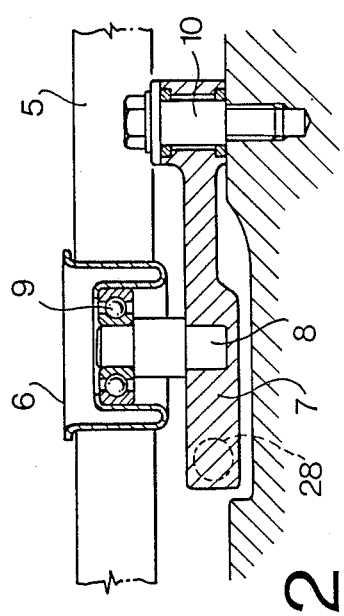
FIG. 2 is a sectional view of a part of FIG. 1.

Referring to FIGS. 1 and 2, a crankshaft pulley 1 is connected to a camshaft pulley 2 through a toothed timing belt 5. An oil pump pulley 3 and an idler pulley 4 engage with the belt at the tight side of the run of the belt 5. A tension pulley 6 bears on the belt 5 at the slack side. The tension pulley 6 is rotatably supported on a central portion of an arm 7 through a bearing 9 mounted on a shaft 8. One end of the arm 7 is rotatably secured to an engine body by a shaft 10. An automatic tensioner 20 is provided adjacent to an upper side of the other end of the arm 7. A tension spring 11 is provided to urge the arm 7 to assist the automatic tensioner 20 so as to decrease the vibration of the belt.

Figure 3:
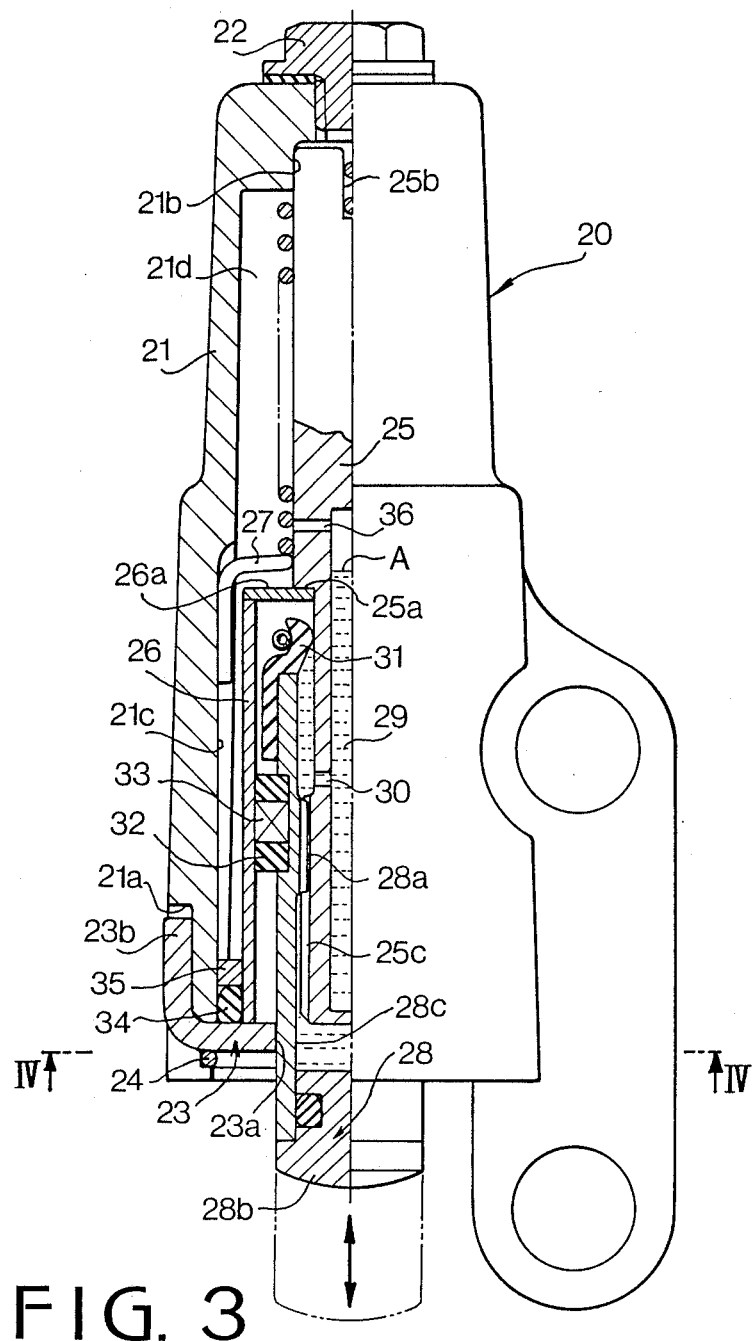
FIG. 3 is a fragmentary sectional view of an automatic tensioner of the present invention.
Figure 4:
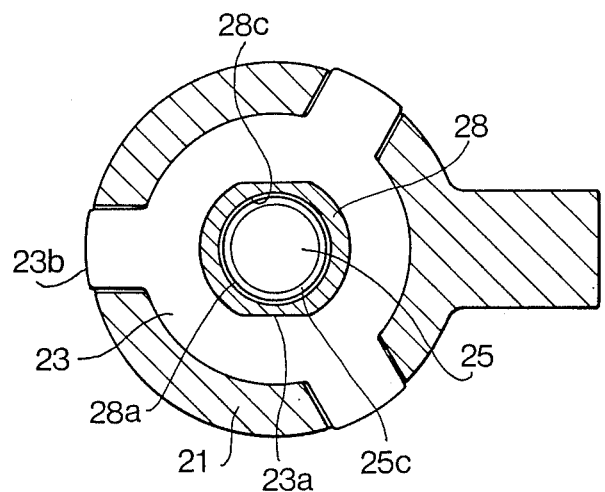
FIG. 4 is a sectional view taken along a line IV—IV of FIG. 3.

Referring to FIGS. 3 and 4 the automatic tensioner 20 has a vertical cylindrical body 21 having an axial chamber 21d. A bolt 22 is screwed in the body to cover an opening at the top of the body 21.

A shaft 25 is axially disposed in the chamber 21d of the body 21. An upper portion of the shaft 25 is rotatably mounted in a recess 21b formed in the body 21. The upper half of the shaft 25 has a large diameter thereby forming a circular corner portion 25a, the underside of which engages a shoulder 26a of a cylindrical stopper 26 axially provided in the body 21. Disposed around the upper half of the shaft 25 in a torsion spring 27, one end of which is engaged with a bore 25b formed on the top of the shaft and the other end to a groove 21c formed in the inner wall of the body 21, so as to apply torque to the shaft 25. An external square thread 25c is formed on a lower periphery of the shaft 25. An oil reservoir 29 wherein a low viscosity lubricating oil A is contained is formed within the shaft 25.

A cylindrical rod 28 has a bore 28c and an internal thread 28a at an intermediate position with respect to the axial length of the bore. The rod 28 is provided in the stopper 26, engaging the thread 28a with the thread 25c of the shaft 25. The rod 28 projects downwardly out of the body 21. A head portion 28b is formed at the bottom end for abutting against the arm 7.

A radial oil passage 30 is formed in the wall of the shaft 25 at a portion above the engaging portion of the threads 25c and 28a so as to communicate the oil reservoir 29 with a space formed between the shaft 25 and the rod 28. A stem seal 31 is mounted between the top end of the rod 28 and the shaft 25 so as to prevent the oil from leaking out of the rod 28. Provided at a middle portion with respect to the axial direction of the rod 28 between the stopper 26 and the rod 28 is an oil seal 33 which is secured by back-up rings 32. Thus, the oil is prevented from leaking out of the stopper. An oil seal 34 and an O-ring 35 are provided in a space between the body 21 and the stopper 26 thereby preventing the leakage of oil from the body 21.

A radial air passage 36 is formed in the wall of the shaft 25 at a portion above the level of the oil A. A circular bearing 23 is formed with an elongated guide opening 23a at the center and having upwardly projecting engaging legs 23b at the periphery. The bearing 23 is engaged with the rod 28 at the opening 23a and attached to the bottom end of the body 21 and secured thereto by a snap ring 24. Each engaging leg 23b engages with a corresponding groove 21a formed on a lower periphery of the body 21. A lower portion of the rod 28 has a cross section having a contour corresponding to the shape of the opening 23a of the bearing 23, so that the rod 28 can be axially moved without rotating. The bearing 23 supports the stopper 26 and hence the shaft 25. The spring 27 and threads 25c and 28a are so arranged that when the shaft 25 is rotated by spring 27, the rod 28 projects as shown by a chain line in FIG. 3.

In operation, the rod 28 is urged by spring 27 to project, thereby rocking the arm 7 about the shaft 10 so that the tension pulley 6 is urged against the timing belt 5. At a position where the component of rotary force at the thread 28a generated by the reaction of the belt 5 balances with the torque of the torsion spring 27, the tension pulley 6 is held to provide a proper belt tension. When the crankshaft 1 is rotated, the timing belt 5 guided by the idler pulley 4 and the tension pulley 6 drives the camshaft pulley 2 and the oil pump pulley 3 in synchronism with the crankshaft 1.

When load on the slack side of the belt 5 is decreased, for example, at the start of the engine, rod 28 is temporarily projected. During the normal operation of the engine, the rod 28 is projected and retracted in accordance with expansion of the belt at warm-up and with contraction of the belt at cold starting. Accordingly, the tension of the belt is automatically kept at a predetermined value by the tension pulley 6.

When the rod 28 is projected increasing the volume of the space in the rod, oil A in the oil reservoir 29 flows through the oil passage 30 into the space. At the same time, air is inducted into the oil reservoir 29 through the air passage 36.

To the contrary, when the rod 28 is retracted decreasing the space, the oil A in the space returns to the oil reservoir 29 through the passage 30 while the air in the oil reservoir 29 is discharged through the air passage 36. Since the level of the oil A is always above the threads 28a and 25c, the threads are thoroughly lubricated. Accordingly, the particles caused by abrasion of the threads heap up on the bottom of the space in the rod 28.

The oil in the rod 28 is prevented from leaking by the stem seal 31. Even if excessive oil is discharged out of the rod 28, oil seals 33 and 34 stop the flow out of the body 21.

In accordance with the present invention, there is provided an automatic tensioner which can be applied to a timing belt since lubricating oil is trapped inside the tensioner by reliable sealing means. Further, since the tensioner can be independently used, extensive usage is possible.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. An automatic belt tensioner comprising:
a substantially vertically disposed cylindrical body having an axial chamber;
a shaft having an oil reservoir in a lower portion thereof and having an external thread and rotatably mounted in the chamber of the body;
a torsion spring provided between the body and the shaft so as to urge the shaft in a rotational direction;
a cylindrical rod having an axial bore and an internal thread provided at an intermediate portion with respect to axial length of the bore and engaged with the external thread of the shaft;
the rod having a lower end being projected from the body so as to be operatively connected to a tension pulley for tensioning a belt;
holding means for holding the rod so as to permit axial movement of the rod;
means for circulating oil between the oil reservoir in the shaft and the bore below the internal thread of the rod;
sealing means for preventing the oil from leaking out of the rod;
the torsion spring and both the threads being arranged to project the rod by the rotation of the shaft urged by the torsion spring.

2. The automatic belt tensioner according to claim 1 wherein the circulating means comprises a passage provided in the shaft so as to communicate the oil reservoir with the bore above the internal thread of the rod, and an air passage 36 provided in the shaft to communicate the oil reservoir with the atmosphere.

* * * * *